United States Patent [19]

Gay

[11] Patent Number: 4,607,431

[45] Date of Patent: Aug. 26, 1986

[54] LINE-TYPE FOLIAGE TRIMMER WITH AUTOMATIC FEED

[76] Inventor: Pierre Gay, Rue de la Petite Gallée, Millery (Rhone), France

[21] Appl. No.: 644,208

[22] Filed: Aug. 24, 1984

[30] Foreign Application Priority Data

Aug. 24, 1983 [FR] France .................. 83 13816

[51] Int. Cl.⁴ .................. A01D 50/00
[52] U.S. Cl. .................. 30/276; 30/347; 56/12.7
[58] Field of Search .................. 30/276, 347; 56/12.7

[56] References Cited

U.S. PATENT DOCUMENTS

| | | | |
|---|---|---|---|
| 4,236,312 | 12/1980 | Forster et al. | 30/276 |
| 4,244,103 | 1/1981 | Snarr | 30/276 |
| 4,290,200 | 9/1981 | Lombard | 30/276 |
| 4,347,666 | 9/1982 | Moore | 30/276 |
| 4,352,243 | 10/1982 | Lombard | 30/276 |
| 4,366,621 | 1/1983 | Mitchell | 30/276 |

FOREIGN PATENT DOCUMENTS 2429550  1/1980  France .

*Primary Examiner*—Douglas D. Watts
*Attorney, Agent, or Firm*—Karl F. Ross; Herbert Dubno

[57] ABSTRACT

A foliage trimmer has a housing centered on an axis, rotatable thereabout in a direction, and formed with a radially open eye. A spool rotatable in the housing carries a supply of a cutting line having a free end extending from the housing through the eye thereof. The spool has an outer periphery formed with at least one radially outwardly open recess or notch. A latching pawl has one end pivoted in the housing adjacent the eye about an axis parallel to the housing axis and an opposite end radially engageable in the notch and angularly offset from the pivoted end relative to the housing rotation direction. This element is displaceable as described above between an inner position with the opposite end in the notch to inhibit rotation of the spool and an outer position with the opposite end clear of the notch and the spool being rotatable. The line passes radially outward around the opposite end and radially inwardly engages same. A drive motor rotates the housing in one direction about the axis to extend the free line end radially from the eye and for urging the opposite end centrifugally outward by direct action of centrifugal force on the opposite end and for urging the opposite end radially inward by centripetal force tightening the line and pressing it radially inward against the pawl. Alternately the notch has relative to the direction a downstream flank facing at least partially radially inward. Rotation of the head urges the opposite pawl end radially inward by camming action of the notch flank against the opposite end.

11 Claims, 10 Drawing Figures

LINE-TYPE FOLIAGE TRIMMER WITH AUTOMATIC FEED

FIELD OF THE INVENTION

The present invention relates to a strand- or line-type foliage trimmer of the type used to clear grass and light vegetation in locations where a landmower cannot go. More particularly this invention concerns the spool feed for the strand of such a device.

BACKGROUND OF THE INVENTION

A standard line-type foliage trimmer has a housing that is rotated about an axis and that contains a spool of a line that acts as a cutting element. The free end of the line extends through an eye from the housing and the spool is normally fixed in the housing, so that when the housing is rotated at high speed the free line end extends radially from the housing and whips about, cutting any light foliage it comes in contact with.

This line, which is typically nylon monofilament, is subject to enormous wear and miscellaneous mechanical action, so that the end breaks off periodically. Thus it is necessary to pay out some more line, to which end some sort of mechanism must be provided that normally holds the spool against rotation while allowing some limited rotation to unwind a new section of line when necessary.

French Pat. No. 2,429,550 and U.S. Pat. No. 4,347,666 describe a system wherein a latch element is provided which is movable between an inner position blocking rotation of the spool in the housing and an outer position permitting such rotation. A spring urges the element into the inner position and centrifugal force is oppositely effective on it. Thus when the line becomes quite short its air resistance will decrease and the rotation speed of the housing will increase. This increases the centrifugal force so that the latch element moves out and allows the spool to pay out some more line. Since the spring force is substantially constant, such a device will therefore only work for a given rotation or drive speed. Thus, if, for instance, the apparatus is old and cannot get up to maximum speed because the drive motor and bearings are worn, the arrangement does not work. In addition such arrangements work in a jerky manner, suddenly releasing and rearresting the spool, so that they are subject to considerable shock and wear and are therefore not reliable.

U.S. Pat. Nos. 4,290,200, 4,236,312, and 4,244,103 use a gripper arrangement that directly engages the strand, pinching it against the housing immediately adjacent the eye. A centrifugally operated spring-biased clamping pawl is normally used in these arrangements, making them speed-sensitive as described above.

Other systems are known which pay out a section of line each time the head is bumped on the ground. These arrangements are disadvantageous in that the decision to pay out more line is left up to the operator. In addition it is fairly common in use to bump the bottom of the head and accidentally send out more line, wasting the cutting strand.

In U.S. Pat. Nos. 4,352,243 and 4,366,621 latching arrangements are shown which do not respond to speed. These arrangements are extremely complex and have short service lives.

OBJECTS OF THE INVENTION

It is therefore an object of the present invention to provide an improved unwinding apparatus for a line-type trimmer.

Another object is the provision of such an unwinding apparatus for a line-type trimmer which overcomes the above-given disadvantages, that is which surely and automatically pays out the line whenever it gets too short.

A further object is to provide an improved trimmer which sensitively and accurately monitors the length of the free end of the line and automatically pays out more line as the free end shortens.

SUMMARY OF THE INVENTION

At least one line is wound up on at least one spool rotatably mounted inside a rotatable housing formed with an eye through which the line extends from the housing which has a latching or blocking element for the spool relative to the housing. This element is subjected on the one hand to a centrifugal force and on the other hand to at least one centripetal force proportional to the centrifugal force applied to the extending line end and is displaceable by these forces between a first position in which it arrests the spool in the rotating housing and a second position in which it frees the spool. According to this invention this blocking element is an inertial pawl rotatably mounted at one end in the housing about an axis extending parallel to the housing rotation axis and close to the eye and has another end subjected to opposite centrifugal and centripetal forces so as to be able to move under the effect of at least one of these forces into at least one recess formed on the periphery of at least one flange of the spool and to move radially outward and leave this recess under the effect of the centrifugal force.

Thus the instant invention balances centrifugal and centripetal forces against each other. Since both these forces are functions of the same velocity, they will bear a fixed relationship to each other and the system will be insensitive to speed. The centrifugal force the pawl is subjected to will be a function of its mass and the velocity, and the centripetal force of the line will be a function of the mass of the extending free end and its velocity. Since the pawl mass does not change but that of the free end does, the system therefore is solely responsive to the mass of the extending free end, which is in turn a direct function of its length. Thus the system of this invention effectively responds to the length of the free line end.

According to this invention the pawl has at least two parallel horizontal branches extending generally perpendicularly from the pawl axis and at least one vertical branch offset from and generally parallel to the pawl axis. The line passes radially outside the vertical branch and bears radially inward thereon, the directional terms being purely relative and based on the assumption that the head axis is vertical. The pawl can have another vertical branch at the pawl pivot axis. It is also possible for the horizontal branches to have bent-out ends seated in the housing.

To prevent pinching and damaging the line between the vertical branch and the housing, the vertical branch is outwardly concave and forms an outwardly open seat for the line. The housing can alternately be radially inwardly concave to form a line-receiving space between itself and the center of the vertical branch.

According to this invention the spool flange is formed with an annularly continuous groove having an inner edge forming the periphery having the recess. The groove is of generally uniform width measured radially of the housing axis and the pawl has a part engaged axially in the groove. This arrangement ensures positive guiding of the pawl. In this arrangement the line can pass radially outside and bear radially inward against the pawl adjacent the part. The force with which the line bears radially inward against the pawl end will be directly proportional to the tension in the line, which is a direct function of the centripetal force.

The housing can contain several such spools all connected together for joint rotation and each carrying a respective supply of the line. In addition the spool can be provided with a deflecting element upstream in the rotation direction of the housing from the pawl. In this case the line passes radially outside the pawl and deflecting element and bears radially inward thereagainst.

The line of this invention is normally a polyamide filament, a metallic chain or cable, or a filament loaded with abrasive particles.

In other words, the instant invention is a foliage trimmer having a housing centered on an axis, rotatable thereabout in a direction, and formed with a radially open eye. A spool rotatable in the housing carries a supply of a cutting line having a free end extending from the housing through the eye thereof. The spool has an outer periphery formed with at least one radially outwardly open recess or notch. A latching pawl has one end pivoted in the housing adjacent the eye about an axis parallel to the housing axis and an opposite end radially engageable in the notch and angularly offset from the pivoted end relative to the housing rotation direction. This element is displaceable as described above between an inner position with the opposite end in the notch to inhibit rotation of the spool and an outer position with the opposite end clear of the notch and the spool being rotatable. The line passes radially outward around the opposite end and radially inwardly engages same. A drive motor rotates the housing in one direction about the axis to extend the free line end radially from the eye and for urging the opposite end centrifugally outward by direct action of centrifugal force on the opposite end and for urging the opposite end radially inward by centripetal force tightening the line and pressing it radially inward against the pawl.

Alternately the notch has relative to the direction a downstream flank facing at least partially radially inward. Rotation of the head urges the opposite pawl end radially inward by camming action of the notch flank against the opposite end. These systems both are extremely simple and can be counted on to function for a long time.

DESCRIPTION OF THE DRAWING

The above and other features and advantages will become more readily apparent from the following, it being understood that any feature described with reference to only one embodiment of the invention can be used where possible with any other embodiment. In the accompanying drawing.

SPECIFIC DESCRIPTION

Figure 1:
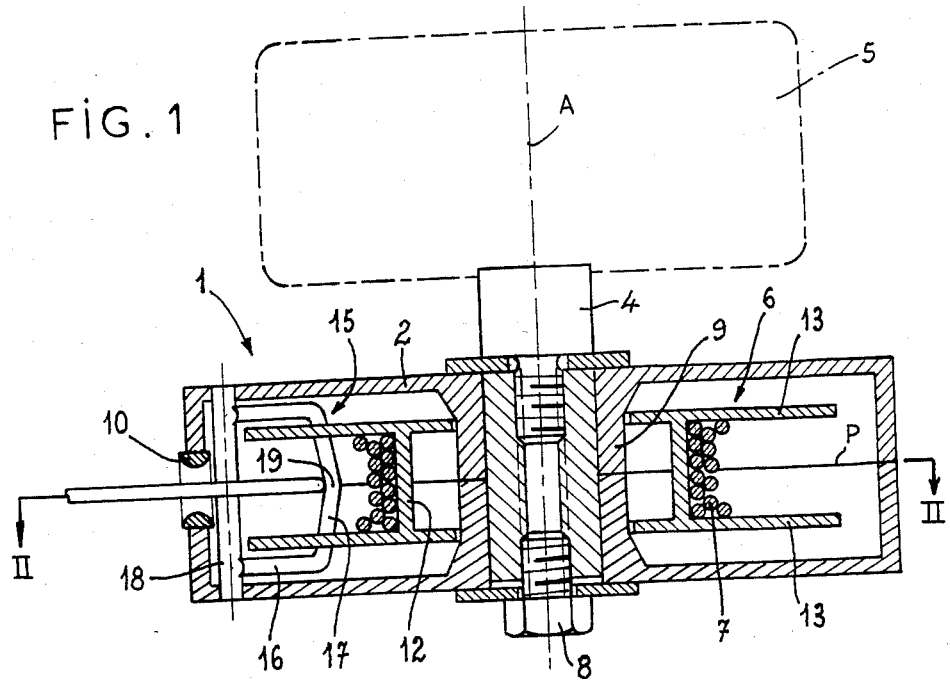
FIG. 1 is an axial section through a dispenser spool head according to the invention.

As seen in FIGS. 1 through 4 the apparatus of this invention has a head 1 comprising a housing 2 of cylindrical shape centered on and rotatable about a normally vertical axis A. This housing 2 is secured by a bolt 8 to the lower end of a drive shaft 4 centered on the axis A and rotated thereabout in a direction C by a motor 5. The housing 2 is formed of two virtually identical parts joined together at a plane P perpendicular to the axis A and has a center tubular core or hub part 9 and has a radially open and throughgoing metallic eye 10.

A spool 6 of a nylon monofilament line 7 has a cylindrical core 12 and two flanges 13 and is loosely received on the hub 9 so it can rotate about the axis A. These flanges 13 are each formed with four axially aligned and angularly equispaced outwardly open notches 14 that are axially aligned with the notches 14 of the other flange 13 and generally V-shaped and symmetrical to respective radii from the axis A.

Figure 3:
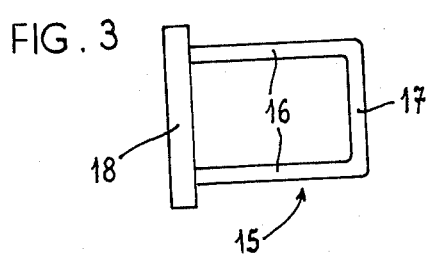
FIG. 3 is a front view of a detail of the head of FIGS. 1 and 2.

A latching element 15 constituted as an inertial pawl shown in detail in FIG. 3 is formed of thick steel wire and has a pair of horizontal branches or sides 16 that normally extend parallel to the plane P, a vertical bight portion 17 bridging the outer ends of these two sides 16, and a pivot pin 18 bridging and projecting past the inner ends of these sides 16. This pin 18 is journaled in the top and bottom plates of the housing 2 just slightly angularly upstream of the center of the eye 10. The portion or leg 17 can engage in the notches 14 and when thus engaged rotationally arrests the spool 6.

Figure 4:
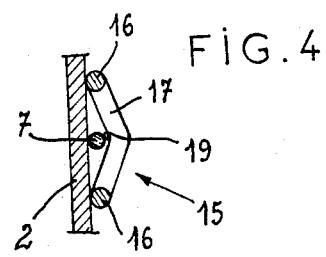
FIG. 4 is a section taken along line IV—IV of FIG. 2.

The line 7, which is wound from its free end 11 in a direction opposite the direction C around the core 12, passes radially outside the vertical branch 17, which to this end is bent somewhat to form a seat 19 as shown in FIG. 4, and then radially inside the pivot leg 18. Thus when the head 1 is rotated at high speed by the motor 5 about the axis A, the free line end 11 will extend perfectly radially outward, being rendered taut by centrifugal force. This creates a centripetal force which is a tension in the line 7 and which is therefore effective radially inward against the outer leg 17 as indicated by arrow R.

This same rotation of the head 1 centrifugally urges the outer leg 17 radially outward with a force indicated at F. Under normal circumstances, that is when the free end 11 is of sufficient length, the force R is greater than the force F and the element 16 rotationally arrests the spool 6. The forces F and R are both a function of the rotation rate and respectively are functions of the mass of the pawl parts 16 and 17 and the free end 11. Thus as the rotation rate increases, both forces F and R will increase, so that the pawl 15 will not move out of the notch 14 it is in.

Figure 2:
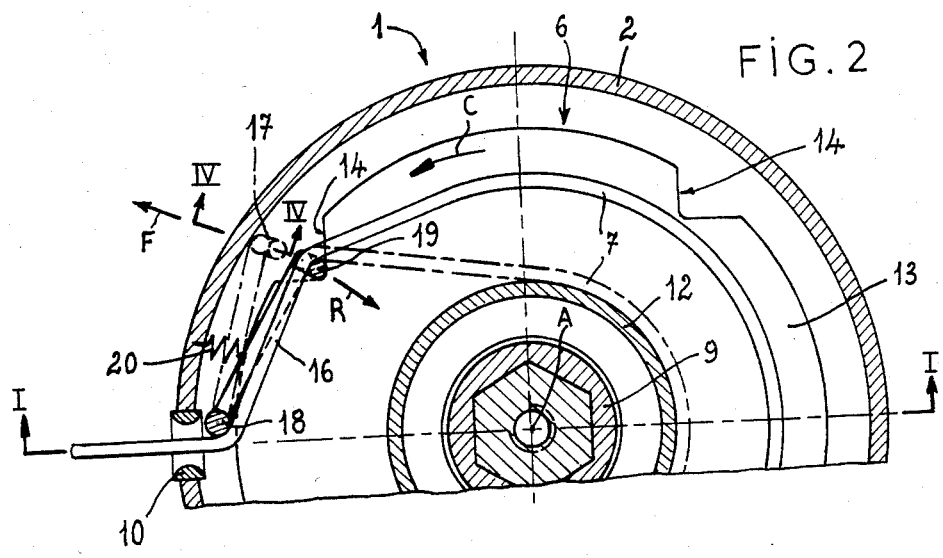
FIG. 2 is a partial cross section taken along line II—II of FIG. 1, the line I—I in FIG. 2 indicating the section plane of FIG. 1.

When, however, the free end 11 is shortened, its mass decreases so the centripetal force R similarly decreases. This allows the latch 15 to pivot counterclockwise as shown in FIG. 2 to allow the spool 6 to rotate and pay out some more line 7. Once enough is payed out to restore the mass of the free end, the centripetal force R again increases and the spool 6 is locked.

A tension spring 20 continuously urges the pawl 15 radially outward so that when the device is stopped it moves the pawl 15 into the dot-dash freeing position of FIG. 2, allowing the user to manually pull out some more line if desired. The force of this spring 20 is nonetheless so very small that in use it has no effect on the above-described automatic unwinding.

The arrangements of FIGS. 5 through 10 use the same reference numerals as in FIGS. 1 through 4 for structurally identical parts.

Figure 5:
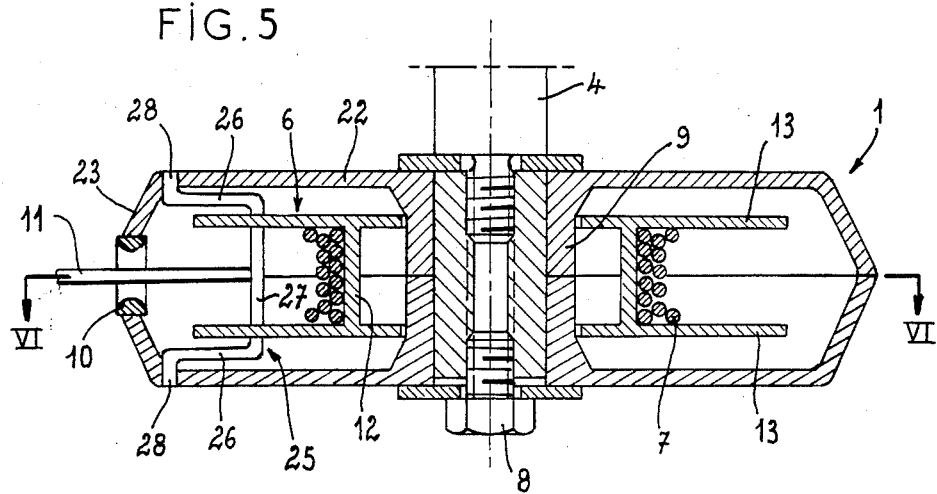
FIG. 5 is an axial section through a second head according to the invention.
Figure 6:
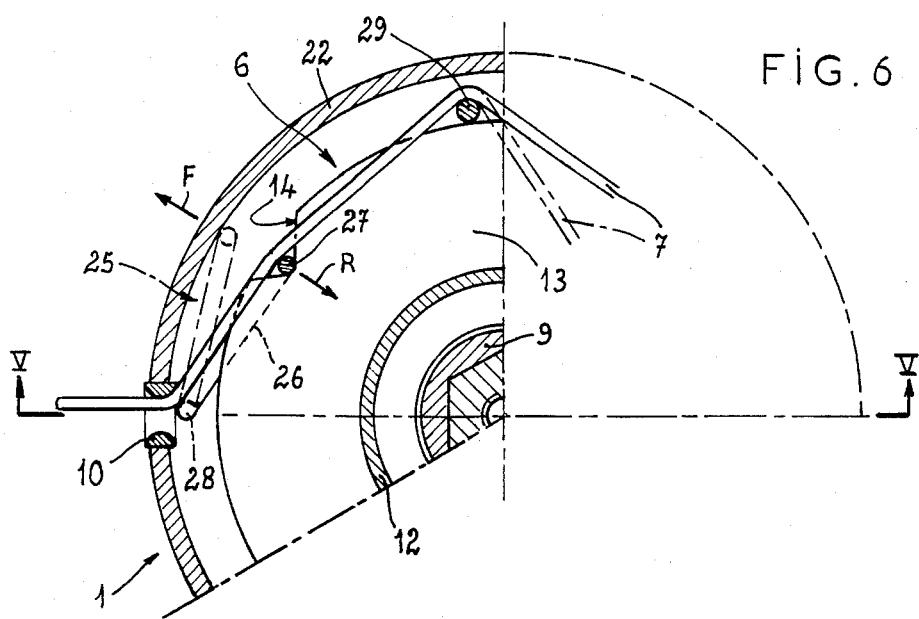
FIG. 6 is a section taken along line VI—VI of FIG. 5, the line V—V of FIG. 6 indicating the section plane of FIG. 5.

In FIGS. 5 and 4 a stirrup- or omega-shaped pawl 25 is employed having two horizontal legs 26 equivalent to the legs 16, and joined by a straight bight portion 27. The outer ends of the legs 26 are bent out at 28 to act as pivots equivalent of the rod 18. The housing has an inwardly concave outer wall 23 that gives room for the filament 7 between itself and the bight 27 so that same can be straight. In addition somewhat upstream of each notch 14 the outer peripheries of the flanges 13 are axially bridged by deflector rods 29.

This arrangement works substantially identically to that of FIGS. 1 through 4. The deflector rod 29 ensures that the line 7 engages the bight 27 at the same angle, regardless whether the spool 6 is full or nearly empty.

Figure 7:
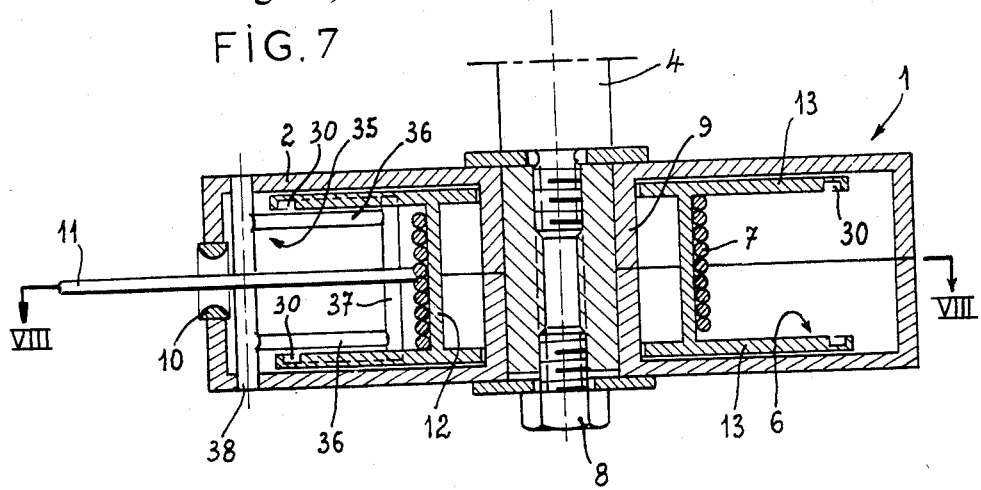
FIG. 7 is an axial section through a third head according to the invention.
Figure 8:
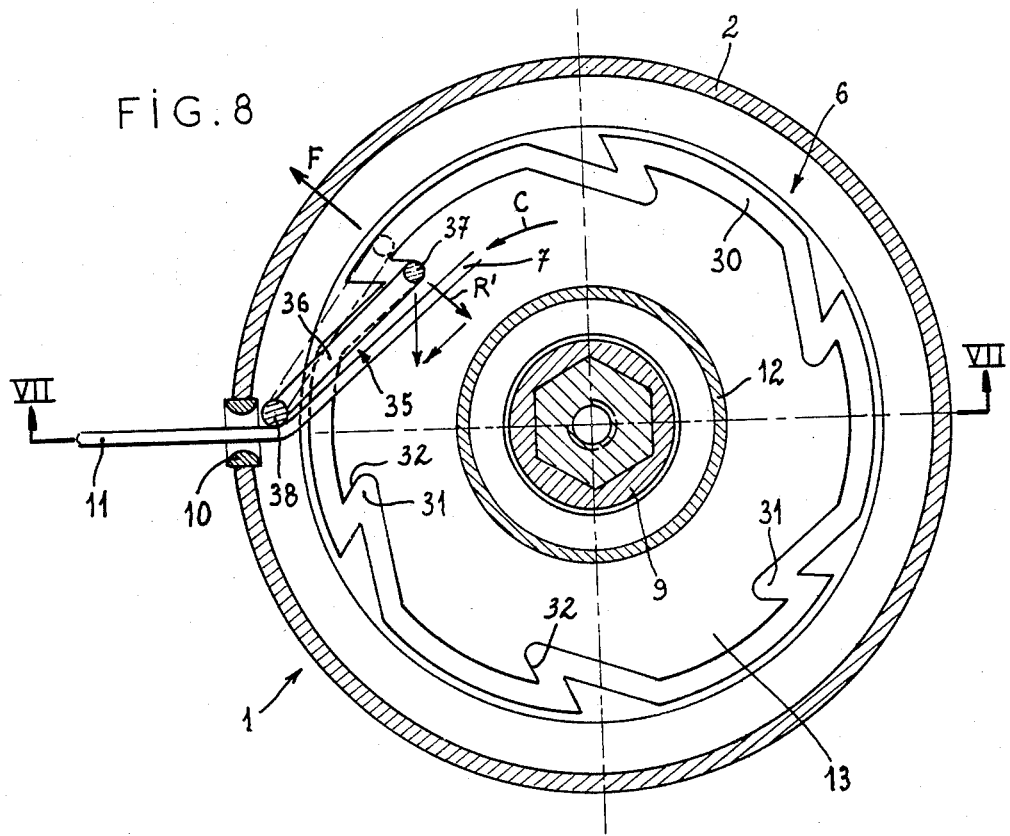
FIG. 8 is a section taken along line VIII—VIII of FIG. 5, the line VII—VII of FIG. 8 indicating the section plane of FIG. 7.

In the system of FIGS. 7 and 8 the centripetal force is effective indirectly on a latching pawl 35 having horizontal legs 36 and a pivot rod 38 identical to the legs 16 and 18, but bridged at their outer ends by a laterally projecting bight rod 37 whose ends are received in zig-zag annular grooves 30 formed on the confronting inner faces of the spool flanges 13. These grooves 30 have notch-forming V-shaped regions 31 that open outward and each have, relative to the rotation direction C, downstream flanks 32 that extend at about 45° to intersecting radii from the axis A so that they are directed radially somewhat inward.

Here the line passes out over the pivot rod 38, which protects the eye 10 from wear and in fact can make this reinforcement eye 10 unnecessary, but does not contact the leg 37. Thus when the arrangement is rotated, the centrifugal force F will be effective on the pawl 35 as for the pawl 15 of FIGS. 1 through 4. The tension in the line 7, which is the centripetal force effective on the free end, pulls the spool 6 in an attempt to rotate it in the direction C, so that the inclined surface 32 cams the bight 37 radially inward with a resultant force R' that is directly proportional to the centripetal force. These forces are balanced as described above with respect to FIGS. 1 through 4 so that when the mass of the free end 11 is too small, the resultant force R' is less than the opposite force F and the spool 6 is freed to rotate and pay out a section of line 7.

Figure 9:
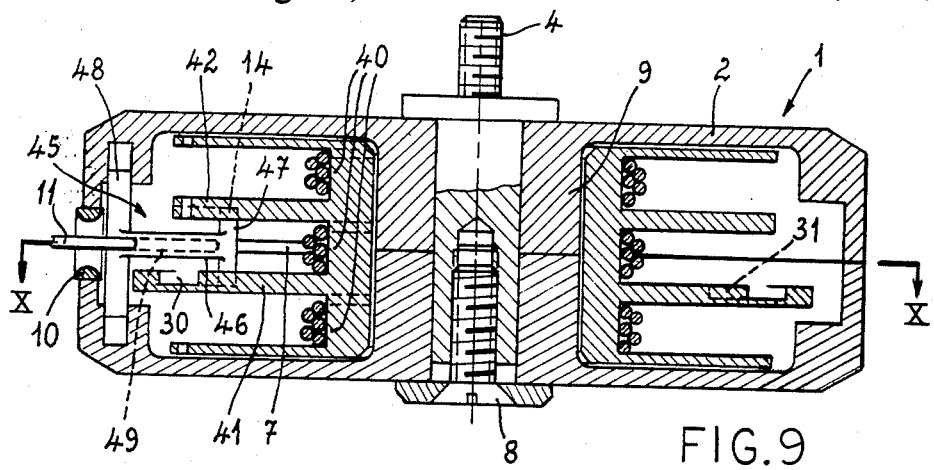
FIG. 9 is an axial section through a fourth head according to the invention.
Figure 10:
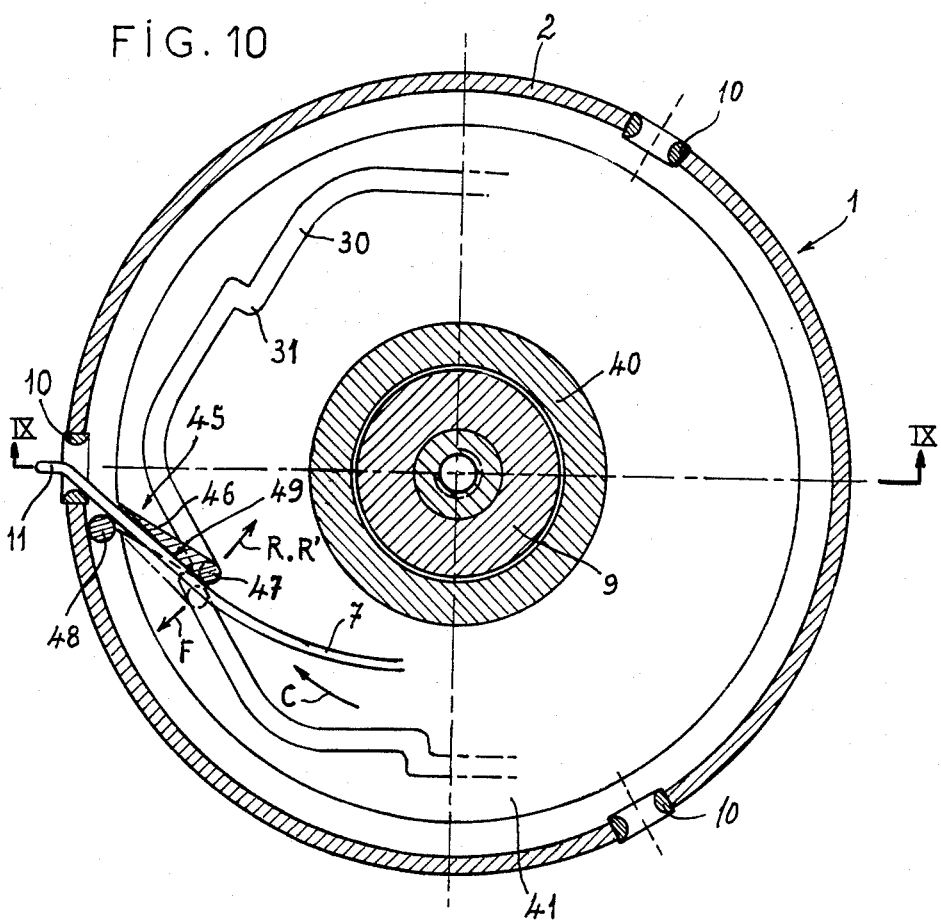
FIG. 10 is a section taken along line X—X of FIG. 9, the line IX—IX of FIG. 10 indicating the section plane of FIG. 9.

FIGS. 9 and 10 show another arrangement with three unitary spools 40 carrying respective lines 7 that project out respective angularly equispaced eyes 10. The center line 7 here serves to operate the automatic feed or unwinding apparatus, as normally all the lines wear at the same rate.

Here the lower flange 41 of the middle spool 40 is formed with a groove 30 and the upper flange 42 with notches 14 that are axially aligned with the elbow regions 31. A latching pawl 45 is basically H-shaped, having one vertical leg 48 serving as pivot, another vertical leg 47 guided in the groove 30 and engageable in the notches 14, and a central leg 46 formed with a passage 40 through which the strand 7 of the middle spool 40 extends. The elbow regions 31 are not so sharp here as in FIGS. 7 and 8, and here the line 7 bears radially inward on the outer leg 47. Thus the centripetal force R is added to the resultant camming force R' to hold the pawl 45 in the inner locking position. When the line is too short, however, the outwardly effective centrifugal force F is sufficient to move out the pawl 45 and pay out some line.

All of these arrangements are substantially insensitive to rotation speed because the inwardly effective centripetal force R and/or R' and the outwardly effective centrifugal force F both grow similarly with speed, canceling each other out. The only change that can affect these forces relative to each other is a change in mass. Thus when the free end becomes less massive the centripetal force decreases. The centrifugal force normally is always fixed, although it is within the scope of this invention to secure screws of different sizes or densities to the pawls to vary the centrifugal force, a heavier screw causing the system to operate with a longer cutting line.

I claim:

1. A foliage trimmer comprising:
   a housing centered on an axis and rotatable thereabout in a direction, the housing being formed with a radially open eye;
   a spool rotatable in the housing and carrying a supply of a cutting line having a free end extending from the housing through the eye thereof, the spool having an outer periphery formed with at least one radially outwardly open notch;
   a latching pawl having one end pivoted in the housing adjacent the eye about an axis parallel to the housing axis and an opposite end radially engageable in the notch and angularly offset from the pivoted end relative to the housing rotation direction, the pawl being displaceable between an inner position with the opposite end in the notch to inhibit rotation of the spool and an outer position with the opposite end clear of the notch and the spool being rotatable, the line passing radially outward around the opposite end and radially inwardly engaging same; and
   motor means for rotating the housing in one direction about the axis to extend the free line end radially from the eye and for urging the opposite end centrifugally outward by direct action of centrifugal force on the opposite end and for urging the opposite end radially inward by centripetal force tightening the line and pressing it radially inward against the pawl.

2. A foliage trimmer comprising:
   a housing centered on an axis and rotatable thereabout in a direcrion, the housing being formed with a radially open eye;
   a spool rotatable in the housing about the housing axis and carrying a supply of a cutting line having a free end extending from the housing through the eye thereof, the line supply being rotationally linked to the spool, the spool having an outer periphery formed with at least one radially outwardly open notch having relative to the direction a downstream flank facing at least partially radially inward;

a latching pawl having one end pivoted in the housing about a pawl axis parallel to the housing axis and an opposite end radially engageable in the notch and angularly offset from the pivoted end relative to the housing rotation direction, the pawl being displaceable between an inner position with the opposite end in the notch to inhibit rotation of the spool and an outer position with the opposite end clear of the notch and the spool being rotatable, the notch flank being inclined such that in the inner position of the opposite pawl end it bears at least generally radially inward on the opposite pawl end, the line being wound around the supply opposite to the direction, whereby when the housing and spool rotate in the direction with the end of the line projecting from the eye the line is centripetally tensioned to urge the spool to rotate opposite to the direction and to cam the opposite end of the pawl inward with the notch flank toward the inner position with a force generally proportional to the tension in the line; and motor means for rotating the housing in the direction about the housing axis to extend the free line end radially from the eye and centripetally tension the line, for urging the opposite end of the pawl centrifugally outward by direct action of centrifugal force on the opposite end, and for urging the opposite end radially inward by camming action of the notch flank against the opposite end.

3. The foliage trimmer defined in claim 2 wherein the pawl has at least two parallel horizontal branches extending generally perpendicularly from the pawl axis and at least one vertical branch offset from and generally parallel to the pawl axis, the line passing radially outside the vertical branch and bearing radially inward thereon.

4. The foliage trimmer defined in claim 3 wherein the pawl has another vertical branch at the pawl pivot axis.

5. The foliage trimmer defined in claim 3 wherein the horizontal branches have bent-out ends seated in the housing.

6. The foliage trimmer defined in claim 3 wherein the vertical branch is outwardly concave and forms an outwardly open seat for the line.

7. The foliage trimmer defined in claim 3 wherein the housing is radially inwardly concave, forming a space between itself and the center of the vertical branch.

8. The foliage trimmer defined in claim 2 wherein the spool flange is formed with an annularly continuous groove having an inner edge forming the periphery having the notch and flank, the groove being of generally uniform width measured radially of the housing axis and the pawl having a part engaged axially in the groove.

9. The foliage trimmer defined in claim 8 wherein the line passes radially outside and bears radially inward against the pawl adjacent the part.

10. The foliage trimmer defined in claim 8 wherein the housing contains several such spools all connected together for joint rotation and each carrying a respective supply of the line.

11. The foliage trimmer defined in claim 2 wherein the line is a polyamide filament, a metallic chain or cable, or a filament loaded with abrasive particles.

* * * * *